Dec. 15, 1931.  S. F. DAVENPORT  1,836,651
ARTIFICIAL BAIT
Filed July 3, 1928
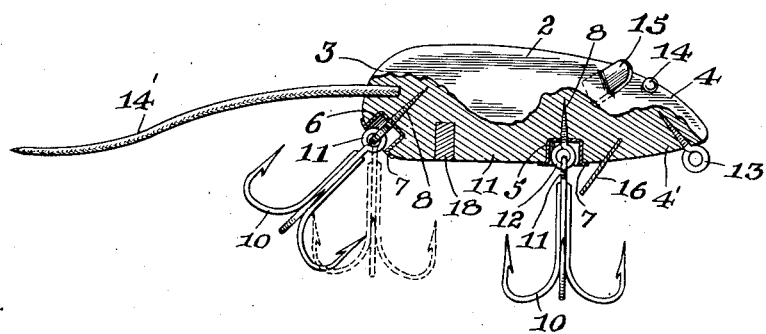
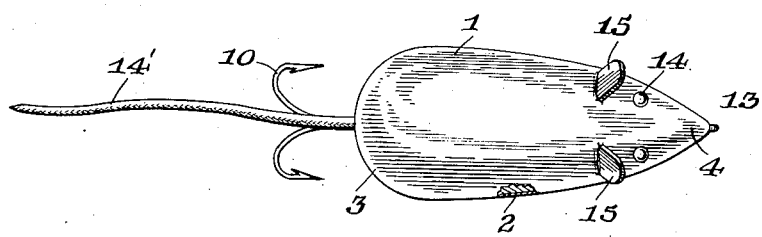
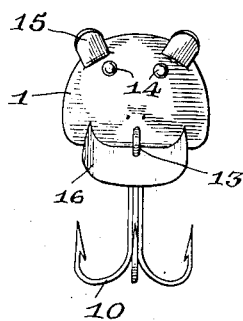
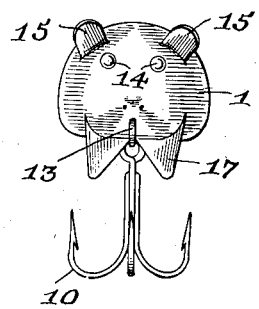
Inventor
S. F. Davenport
By Eccleston & Eccleston,
Attorneys Patented Dec. 15, 1931

1,836,651

UNITED STATES PATENT OFFICE

SAM F. DAVENPORT, OF AUBURN, INDIANA, ASSIGNOR TO THE CREEK CHUB BAIT CO., OF GARRETT, INDIANA

ARTIFICIAL BAIT

Application filed July 3, 1928. Serial No. 290,114.

This invention relates to artificial baits or lures and especially to that type of bait or lure generally known as plug baits.

The primary object of the invention resides in the provision of a simple and efficient plug lure that can be manufactured at a relatively low cost, and which will closely simulate the appearance and action of a live body, such as a mouse, when in use.

Other objects and advantages of the invention will be apparent from the following description when taken in connection with the accompanying drawings; in which Figure 1 is a side elevation of the lure, parts being broken away.

Figure 2 is a plan view thereof.

Figure 3 is a front elevation of the lure; and

Figure 4 is a view similar to Figure 3, but showing a slightly modified construction.

Referring to the drawings in greater detail, the numeral 1 indicates the body portion of the lure which is formed of some buoyant material such as wood, or the like, and is provided with a suitable finish 2, preferably mouse colored paint or enamel. This body portion is preferably shaped in representation of the body of a mouse and is rounded at its rear end and downwardly inclined at its forward end, as indicated by the numerals 3 and 4 respectively. An upwardly inclined portion 4' is also provided at the forward end of the bottom of the lure.

The under side of the body portion of the lure is provided with recesses 5 and 6 adjacent the forward end and at the rearward end, and in which are mounted metal ferrules or linings 7. Mounted in these ferrules or cup-shaped members by means of the wood screws 8 are the gang hooks 10; these hooks being pivoted by reason of their eyes 11 being associated with the eyes 12 on the wood screws. Also extending from the under side of the bait body is a line securing means 13 which comprises a wood screw threaded into the forward portion of the bait body; the essential feature being that the attaching means be arranged at the lower portion of the lure body.

In further simulation of the appearance of a mouse, the upper forward portion of the body 1 is provided with beads or the like 14, in representation of the eyes of a mouse, and likewise, a flexible member 14' formed either of woven, twisted, or braided fabric, similar in appearance to the tail of a mouse, is attached to the rear end of the body portion. In simulation of the ears of a mouse, flat strips of celluloid or the like as indicated by the numeral 15 are attached to the upper portion of the body 1 adjacent the forward end thereof, and it should be particularly noted that these members 15 are inclined forwardly and upwardly so as to serve as planes to partly elevate the lure out of the water as it is being drawn forwardly when in use. Likewise, a member 16 of celluloid or the like is secured to the under portion of the lure adjacent the forward end thereof, and is inclined downwardly and rearwardly as indicated in Figure 1. This plane 16 is the representation of the front legs of a mouse and also serves as a plane in its reaction on the water as the lure is being drawn forwardly and tends to lift the lure more or less out of the water.

In the modified construction shown in Figure 4 a bifurcated plate 17 is shown in representation of the front legs of a mouse, rather than the continuous plate 16 of Figure 3.

In order that the lure may assume a substantially horizontal position in the water and so as to definitely fix the buoyancy of the lure that the body portion thereof will remain about half submerged when at rest, a weight 18 is mounted in the under side thereof adjacent the rear end as indicated in Figure 1.

In the operation of the device the lure will float in a practically horizontal positon about one-half submerged in the body of water. When drawn through the water the downwardly tapering nose 4 will tend to force the lure under the surface of the water; this tendency being more pronounced as the speed of travel of the lure is increased. This tendency of the lure to submerge is counteracted by three separate elements, namely, the fact that the line is attached to member 13 which is positioned at the under surface of the body portion of the lure; by the planing action of the parts 16 or 17; and by the planing action of the forwardly and upwardly inclined ears 15, the surface of these latter elements tending to act in connection with the elements 16 or 17 when the lure attains a certain position where the water strikes against them.

The drawing of the lure slowly through the water will closely simulate the appearance of a mouse; the surface of the water being slightly disturbed and a "wake" appearing behind similar to that produced by a mouse. The water flowing past the members 16 or 17 will be deflected and disturbed so that the members 16 or 17 and the forward hook 10 become in appearance a pair of rapidly moving legs; the rear hook 10 performing a like function to simulate the hind legs, while the tail accentuates the naturalness of the entire device.

On increasing the speed the ears 15 catch the water flowing against them and a vacuum forms behind them, producing an appearance of two spurting jets along the back accompanied by a sound similar to a small animal struggling in the water. By elevating the rod tip and retrieving the lure in a series of short jerks, an effect is obtained as of a mouse partly rising out of the water and falling back as if trying to escape something from below. When the lure is allowed to rest quietly and then given a sharp jerk, it creates an effect in the water as of a mouse convulsively struggling and this effect is accompanied by a sound indicative of the action.

All of the effects and actions above noted are enhanced by the shape of the body portion of the lure, namely, its practically flat under surface, its double tapering front 4—4', its comparatively large rear end which is rounded and tends to overbalance the flat bottom and produce a rolling motion. Moreover, the location and manner of attaching the hooks 10 is such that they not only are best presented to the fish, but they also cannot come into contact with each other and become interlocked so as to destroy their efficiency.

From the foregoing description taken in connection with the accompanying drawings it will be apparent to those skilled in the art that I have devised an exceedingly simple and inexpensive construction of lure of the plug type, which is highly efficient in action and closely simulates the apperance and action of a live body, such as a mouse, when in use.

In accordance with the patent statutes I have described what I now believe to be the preferred form of the invention, but it will be readily understood that various minor changes and modifications may be made in the details of the construction of the lure without in any way departing from the spirit of the invention as disclosed herein, and all such changes or modifications are intended to be included within the scope of the appended claims.

What I claim as new and desire to secure by Letters Patent is:

1. An artificial bait including a body portion of buoyant material provided with a rounded rear end, a substantially flat bottom, a downwardly inclined forward end, inclined members secured to the top and bottom of said body portion symmetrically arranged so as to elevate the latter as it is drawn through the water, and line securing means attached to the body portion below the median line thereof.

2. An artificial bait including a body portion of buoyant material shaped to simulate the appearance of a mouse, upwardly and forwardly inclined members secured to said body portion in simulation of ears, a downwardly and rearwardly inclined member secured to said body portion in simulation of legs, and line securing means attached to the body portion.

SAM F. DAVENPORT.